United States Patent [19]

Fischer et al.

[11] Patent Number: 5,736,598
[45] Date of Patent: Apr. 7, 1998

[54] ANTISTATIC COLORED THERMOPLASTIC MOLDING MATERIALS

[75] Inventors: Wolfgang Fischer, Ludwigshafen; Karl Hennig, Hessheim; Norbert Mosbach, Maxdorf; Rainer Neumann, Mutterstadt; Bernd Niedermaier, Ludwigshafen, all of Germany

[73] Assignee: BASF Aktiengesellschaft, Ludwigshafen, Germany

[21] Appl. No.: 590,457

[22] Filed: Jan. 23, 1996

[30] Foreign Application Priority Data

Jan. 23, 1995 [DE] Germany .................. 195 01 907.5

[51] Int. Cl.⁶ .......................... C08K 5/17; C08K 5/3445
[52] U.S. Cl. ............................... 524/106; 524/89
[58] Field of Search .......................... 524/106, 89

[56] References Cited

U.S. PATENT DOCUMENTS 5,157,067  10/1992  Burditt et al. .................. 524/270

FOREIGN PATENT DOCUMENTS

| 211651 | 2/1987 | European Pat. Off. . |
| 267695 | 5/1988 | European Pat. Off. . |
| 457844 | 5/1965 | Switzerland . |
| 1089810 | 11/1967 | United Kingdom . |

OTHER PUBLICATIONS

Einfarben von Kunststoffen, VDI–Verlag GmbH, 1975, 225–227.

*Primary Examiner*—Mark L. Warzel
*Attorney, Agent, or Firm*—Keil & Weinkauf

[57] ABSTRACT

A thermoplastic molding composition which includes a thermoplastic polymer and

A) a dye which is soluble therein, and
B) a N,N-bis (2-hydroxyethyl)-$C_6$–$C_{22}$-alkylamine or N,N-bis (2-hydroxyethyl)-$C_6$–$C_{22}$-alkenylamine, this compound having a Hazen color number as specified in German Standards Specification DIN 53409 of below 300.

5 Claims, No Drawings

ANTISTATIC COLORED THERMOPLASTIC MOLDING MATERIALS

BACKGROUND OF THE INVENTION

1. Field of the Invention

The present invention relates to thermoplastic molding materials comprising

A) a dye which is soluble therein, and

B) a N,N-bis(2-hydroxyethyl)-$C_6$-$C_{22}$-alkylamine or N,N-bis(2-hydroxyethyl)-$C_6$-$C_{22}$-alkenylamine, this compound having a Hazen color number as specified in German Standards Specification DIN 53409 of below 300.

The invention further relates to a process for producing molded articles and to molded articles from these molding materials.

2. Description of Related Art

Plastic materials usually contain additives of various kinds which render the molding materials suitable for certain applications, including, as will be common knowledge, antistats which counter-act the undesirable electrostatic charge build-up on plastics.

Frequently used for this purpose are N,N-bis(2-hydroxyethyl)-$C_6$-$C_{22}$-alkylamines or -alkenylamines, some of which are commercially available.

In the case of plastics colored with soluble dyes, these bis-(hydroxyethyl)amines have the disadvantage that they impair the coloring, the degree of impairment increasing with the processing temperatures involved in the production of the molding materials and the molded articles and with the original impurity of the antistat.

It is an object of the present invention to remedy this disadvantage.

We have found that this object is achieved by the above-defined thermoplastic molding materials.

SUMMARY OF THE INVENTION

Suitable for the transparent coloring of molding materials are soluble dyes of various structures, for example azo dyes, anthraquinone dyes, monomethine dyes and also indoline and nigrosin bases. In the case of complexes, those of chromium are preferred. Details are given in the monograph *Einfärben von Kunststoffen* [Coloring of plastics], ed. German Engineers' Association, VDI-Verlag Düsseldorf 1975, p. 225 ff.

DESCRIPTION OF PREFERRED EMBODIMENTS

A particularly important dye for the transparent coloring of plastics is the yellow monomethine dye Solvent Yellow 93 (Colour Index No. 48160), which has the structure

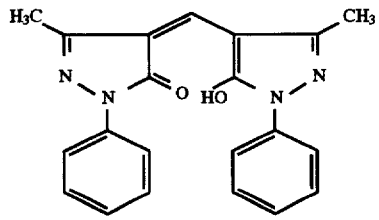
(I)

The concentration of soluble dye in the molding materials depends on the desired color intensity, and generally ranges from 0.00005 to 5, particularly from 0.0001 to 2.5%, by weight.

Component B) of the thermoplastic molding materials of the present invention is an N,N-bis(2-hydroxyethyl)-$C_6$-$C_{22}$-alkylamine or an N,N-bis(2-hydroxyethyl)-$C_6$-$C_{22}$-alkenylamine, and accordingly has the structure

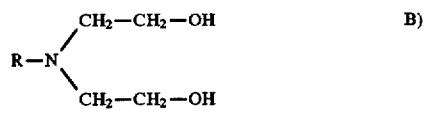
B)

where R is $C_6$-$C_{22}$-alkyl or $C_6$-$C_{22}$-alkenyl, respectively. These compounds, which are mostly known, are obtainable in a conventional manner by reacting ethylene oxide with an amine R—$NH_2$.

Preference is given to compounds B) in which R is $C_{12}$-$C_{18}$-n-alkyl. Mixtures of different ethoxylated amines B are also suitable, for example the commercial product Armostat® 400 from Akzo, Düren, Germany, a mixture of ethoxylated $C_{12}$- and $C_{14}$-alkylamines.

As an essential feature of the present invention, compounds B) have a Hazen color number of below 300. The Hazen color number is determined as specified in German Standards Specification DIN 53409, and is also known as the APHA (American Public Health Association) value. It indicates the number of mg of platinum (as potassium hexachloroplatinate(IV) ($K_2PtCl_6$) and cobalt(II) chloride ($CoCl_2 \cdot 6H_2$) in a ratio of 1.246:1 in 1000 ml of aqueous hydrochloric acid) which has the same or substantially the same color as the sample when the path length is the same. A color number of 300 corresponds to a slightly yellowish coloring.

When the Hazen color number of B) is below 300, the coloring of the plastic colored with a soluble dye will remain constant. When the color number is above 300, the above-described undesirable discolorings occur under the processing conditions and thereafter in the course of time, which is presumably ascribable to impurities which tend to undesirable reactions whose reaction products increasingly impair the coloring.

Compound B) with a color number above 300 are therefore in need of purification, for example by distillation or by treatment with an adsorbent such as activated carbon. Preference is given to compounds having a color number of below 260.

The proportion in the molding materials of antistatic compounds B is customarily from 0.01 to 10%, preferably from 0.05 to 8% particularly preferably from 0.1 to 5%.

Preference is given to using not only dye A) but also antistat B) in the form of homogeneous masterbatches. These concentrates contain the plastic in question and comparatively large amounts of one or more additives. They are easier to incorporate uniformly into large amounts of the plastic than the pure compounds A) or B) alone.

The thermoplastic molding materials comprising the soluble dye A) and the ethoxylated B) can be based on various polymers.

Suitable polymers are in particular homo- and copolymers of styrene, α-methylstyrene, acrylonitrile, methacrylonitrile, of $C_1$-$C_{12}$-alkyl acrylates and methacrylates, and of butadiene.

Examples of such polymers are polystyrene, copolymers of styrene and acrylonitrile in which the styrene may be wholly or partly replaced by α-methylstyrene and acrylonitrile wholly or partly by methacrylonitrile, and by polymethyl methacrylate.

It is also possible to use mixtures of these polymers with elastomeric polymers, for example polybutadiene and/or polyalkyl acrylate.

Further suitable base materials are homo- and copolymers of ethylene, propylene, isobutene and 1-butene. Also suitable are polycondensation and polyaddition products such as polyesters, polyamides, polyurethanes, polycarbonates and polyphenylene ethers.

In addition, the dye A) and the ethoxylated amine B) can also be present in thermoplastic molding materials based on blends of the polymers mentioned.

Of course, the molding materials of the present invention may additionally include further processing and application aids such as lubricants, demolding agents, flame retardants, pigments, antioxidants, UV stabilizers and also fibrous and pulverulent fillers and reinforcing agents in the amounts customary for them.

The molding materials for the present invention are produced in a conventional manner, so that there is no need for a more particular description on this point.

The molding materials can be used to produce molded articles of all kinds in a conventional manner, for example by extrusion or injection molding.

The molding materials of the present invention are notable for high color constancy. The color of the plastics granules obtained on extrusion does not change in the course of further processing, and the molded articles obtained have stable coloring.

Particular advantages are offered by the molding materials of the present invention, in the case of Solvent Yellow 93 (Colour Index No. 48160), since colorings with this dye, which is particularly important for the coloring of plastics, have previously proven particularly susceptible to discoloration.

EXAMPLES

A commercial copolymer of 67% by weight of styrene and 33% by weight of acrylonitrile was intimately admixed in a known manner with 0.003% by weight of a dye mixture A) of Solvent Yellow 93 of structure (I) (C.I. No. 48160), comprising 70% by weight of the dye mixture, Solvent Violet 13 (C.I. No. 60725) of the structure

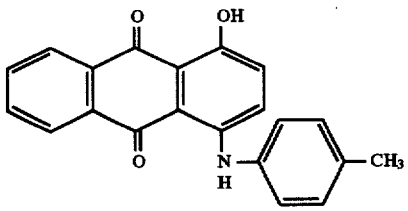

comprising 24% by weight of the dye mixture,
Solvent Red 139 of the structure

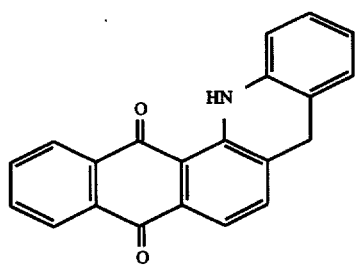

comprising 6% by weight of the dye mixture, and either

B/1) 2% by weight of a mixture of bis(ethoxylated) $C_{12}$-n-alkylamine and bis(ethoxylated) $C_{14}$-n-alkylamine with a Hazen color number of 250, or for comparison B1') 2% by weight of a mixture corresponding to B/1) with a Hazen color number of 320 on an extruder, extruded and granulated.

The granules were made into round disks at 230° C. and 280° C.

The Hazen color number of the antistat was determined as specified in German Standards Specification DIN 53409; the concentrations are each based on the weight of the molding material.

The color stability of the mixtures was judged by visually determining the extent to which the color of the round disks produced at 230° C. and 280° C. differs from the color of round disks produced in the same way but without antistat. Compared with these comparative disks, the disks containing B/1) showed no discoloration, independently of the injection molding melt temperature, whereas the color quality in the case of the use of B/1') was visibly distinctly worse.

We claim:

1. A thermoplastic molding material comprising a thermoplastic polymer and

A) a dye which is soluble in the polymer, and

B) a N,N-bis(2-hydroxyethyl)-$C_6$–$C_{22}$-alkylamine or N,N-bis(2-hydroxyethyl)-$C_6$–$C_{22}$-alkenylamine, this compound having a Hazen color number as specified in German Standards Specification DIN 53409 of below 300.

2. A thermoplastic molding material as defined in claim 1 wherein the soluble dye A) is Solvent Yellow 93 (C.I. No. 48160) having the structure

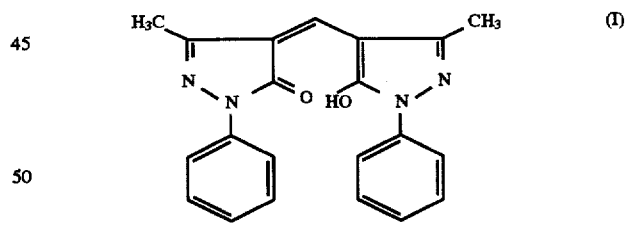

3. A thermoplastic molding material as defined in claim 1, wherein the thermoplastic polymer is a homo- or copolymer of styrene, α-methylstyrene, acrylonitrile, methacrylonitrile, $C_1$–$C_{12}$-alkyl acrylate or methacrylates or conjugated aliphatic dienes.

4. A thermoplastic molding material as defined in claim 1, wherein the thermoplastic polymer is a homo- or copolymer of ethylene, propylene, isobutene or 1-butene.

5. A molded article formed from the thermoplastic molding materials of claim 1.

* * * * *